(12) United States Patent
Fukunaga

(10) Patent No.: US 11,729,515 B2
(45) Date of Patent: Aug. 15, 2023

(54) IMAGING APPARATUS, INFORMATION PROCESSING METHOD, AND RECORDING MEDIUM FOR DETERMINING WHETHER AN IMAGE ANALYSIS OF A PREDETERMINED IMAGE IS COMPLETE

(71) Applicant: CANON KABUSHIKI KAISHA, Tokyo (JP)

(72) Inventor: Kentaro Fukunaga, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 3 days.

(21) Appl. No.: 17/506,555

(22) Filed: Oct. 20, 2021

(65) Prior Publication Data
US 2022/0132028 A1    Apr. 28, 2022

(30) Foreign Application Priority Data

Oct. 22, 2020   (JP) ................................. 2020-177464

(51) Int. Cl.
*H04N 23/80*    (2023.01)
*G06T 1/00*     (2006.01)

(52) U.S. Cl.
CPC ........... *H04N 23/80* (2023.01); *G06T 1/0007* (2013.01); *G06T 2200/24* (2013.01)

(58) Field of Classification Search
CPC ........... H04N 5/23229; H04N 5/23209; H04N 5/23225; H04N 5/232; H04N 5/2251; H04N 5/23203; G06T 1/0007; G06T 2200/24
See application file for complete search history.

(56) References Cited

U.S. PATENT DOCUMENTS

| | | | | |
|---|---|---|---|---|
| 5,535,011 | A  * | 7/1996 | Yamagami | H04N 1/00236 386/E5.013 |
| 6,525,767 | B2 * | 2/2003 | Saito | H04N 1/00241 348/E5.025 |
| 2003/0231343 | A1* | 12/2003 | Kobayashi | H04N 1/00965 358/1.16 |
| 2006/0001746 | A1 | 1/2006 | Watanabe | |
| 2018/0061081 | A1* | 3/2018 | Nagao | G06V 20/53 |

FOREIGN PATENT DOCUMENTS

WO    2013011988 A1    1/2013

OTHER PUBLICATIONS

Joseph Redmond, et al., YOLO9000: Better, Faster, Stronger, https://doi.org/10.48550/arXiv.1612.08242, XP80742903.

* cited by examiner

*Primary Examiner* — Hung H Lam
(74) *Attorney, Agent, or Firm* — Canon U.S.A., Inc. IP Division

(57) ABSTRACT

An imaging apparatus to which an attachable and detachable device attachable to and detachable from the imaging apparatus can be attached includes a control unit configured to cause the attachable and detachable device attached to the imaging apparatus to start an image analysis of a predetermined image, a determination unit configured to determine whether the image analysis of the predetermined image is completed, and a determining unit configured to, based on a result of the determination by the determination unit, determine a waiting time from when the imaging apparatus causes the attachable and detachable device to start an image analysis of a captured image captured by the imaging apparatus to when the imaging apparatus requests the attachable and detachable device to acquire a result of the image analysis.

14 Claims, 9 Drawing Sheets

FIG.7A
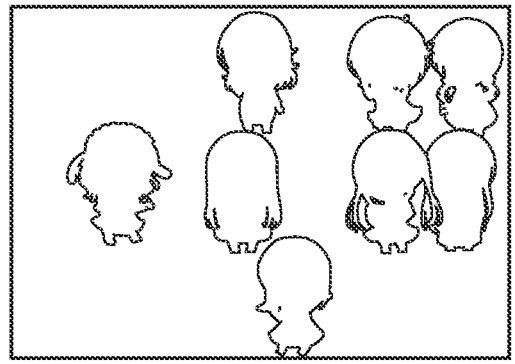
FIG.7B
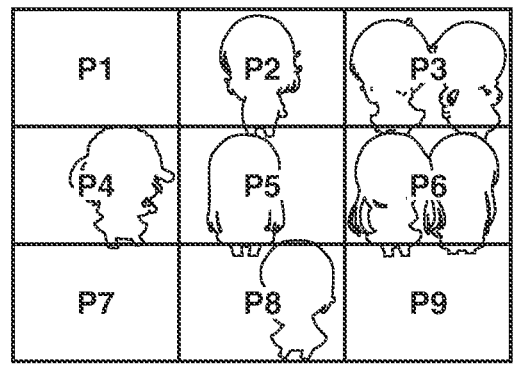
FIG.7C
| PATCH NUMBER | NUMBER OF PEOPLE |
|---|---|
| P1 | 0 |
| P2 | 1 |
| P3 | 2 |
| P4 | 1 |
| P5 | 1 |
| P6 | 2 |
| P7 | 0 |
| P8 | 1 |
| P9 | 0 |

IMAGING APPARATUS, INFORMATION
PROCESSING METHOD, AND RECORDING
MEDIUM FOR DETERMINING WHETHER
AN IMAGE ANALYSIS OF A
PREDETERMINED IMAGE IS COMPLETE

BACKGROUND OF THE INVENTION

Field of the Invention

The present invention relates to an imaging apparatus, an information processing method, a program and a computer-readable data carrier.

Description of the Related Art

In recent years, an image analysis for detecting and tracking an object and estimating an attribute using an image captured by an imaging apparatus (e.g. a camera), and image processing for estimating the number of objects based on the result of such an image analysis are performed. Conventionally, such image processing is performed by transferring an image captured by an imaging apparatus to a high-performance arithmetic apparatus such as a personal computer (PC) or a server that executes the image processing. With an improvement in the processing capability and the downsizing of arithmetic devices, the imaging apparatus has become capable of performing the image processing. The processing performed in the imaging apparatus can be executed by an arithmetic device provided in the main body of the imaging apparatus.

However, the processing capability of the arithmetic device included in the imaging apparatus may not be sufficient, and thus it is desirable that a device attachable to and detachable from the imaging apparatus is attached to the imaging apparatus and caused to execute an arithmetic process. At this time, in a case where the imaging apparatus causes the attachable and detachable device to execute the arithmetic process, it may be difficult to grasp the time required for the attachable and detachable device to execute the arithmetic process, depending on the type of the attachable and detachable device. Regarding a device attachable to an imaging apparatus, International Patent Application Publication No. 2013/011988 discusses a technique in which a light-emitting unit attachable to a camera transmits, to the camera, information indicating the time in which the light-emitting unit can emit light.

SUMMARY OF THE INVENTION

According to an aspect of the present invention, an imaging apparatus to which an attachable and detachable device attachable to and detachable from the imaging apparatus can be attached includes a control unit configured to cause the attachable and detachable device attached to the imaging apparatus to stark an image analysis of a predetermined image, a determination unit configured to determine whether the image analysis of the predetermined image is completed, and a determining unit configured to, based on a result of the determination by the determination unit, determine a waiting time from when the imaging apparatus causes the attachable and detachable device to start an image analysis of a captured image captured by the imaging apparatus to when the imaging apparatus requests the attachable and detachable device to acquire a result of the image analysis.

Further features of the present invention will become apparent from the following description of embodiments with reference to the attached drawings.

BRIEF DESCRIPTION OF THE DRAWINGS

FIG. 7A is a diagram illustrating a test image for measuring a time required for an analysis process according to the embodiments.

FIG. 7B is a diagram illustrating the test image for measuring the time required for the analysis process according to the embodiments.

FIG. 7C is a diagram illustrating the test image for measuring the time required for the analysis process according to the embodiments.

DESCRIPTION OF THE EMBODIMENTS

Figure 1:
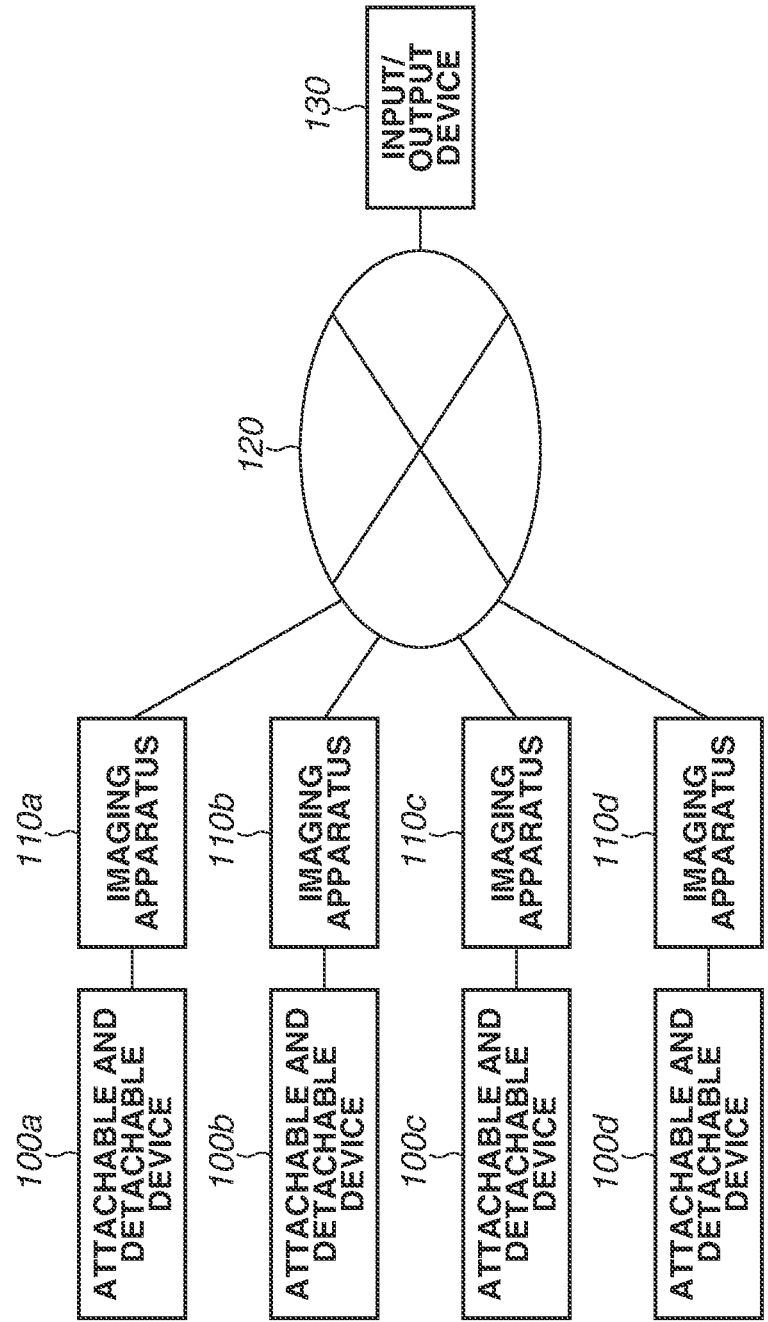
FIG. 1 is a diagram illustrating an example of a system configuration according to different embodiments of the present invention.

Embodiments of the present invention will now be described in detail in accordance with the accompanying drawings.

Based on the attached drawings, embodiments of the present invention will be described in detail below. Configurations illustrated in the following embodiments are merely examples, and the present invention is not limited to the configurations described in the following embodiments. In the embodiments, a redundant description is appropriately omitted. Although a plurality of features is described in the embodiments, not all features are essential to the invention, and different features may optionally be combined together. The embodiments can be applied to imaging techniques for various purposes such as for the purpose of monitoring and the purpose of broadcasting. The following embodiments can be applied to an imaging apparatus (a network camera) capable of connecting to a network and communicating with another apparatus. The following embodiments are also applicable to an imaging apparatus incapable of connecting to a network. In the embodiments, an image as a target of an image analysis may be a still image or may be a moving image. Although the embodiments are described using an imaging apparatus as an example, the present invention is also applicable to other electronic devices.

System Configuration

A first embodiment is described below. An attachable and detachable device 100 (100*a* to 100*d*) is an arithmetic device attachable to and detachable from an imaging apparatus 110 (110a to 110d). As an example, the attachable and detachable device 100 is a device in which a predetermined processing circuit is mounted on a Secure Digital (SD) card. The attachable and detachable device 100, however, does not need to have all the functions of an SD card.

For example, the attachable and detachable device 100 is in the form of an SD card such that the entirety of the attachable and detachable device 100 can be inserted into the imaging apparatus 110. The attachable and detachable device 100 is thus configured to connect to the imaging apparatus 110 in such a manner that the attachable and detachable device 100 has no portion protruding from the imaging apparatus 110. Alternatively, for example, the attachable and detachable device 100 may be configured so that half or more of the attachable and detachable device 100 can be inserted into the imaging apparatus 110. In this case, the attachable and detachable device 100 is configured to connect to the imaging apparatus 110 in the state where the attachable and detachable device 100 has a small portion protruding from the imaging apparatus 110. This can prevent the attachable and detachable device 100 from interfering with an obstacle such as wiring and further enhance convenience when the device is used. The attachable and detachable device 100, however, may not necessarily need to be configured so that half or more of the attachable and detachable device 100 can be inserted into the imaging apparatus 110.

In the imaging apparatus 110 such as many existing network cameras, an SD card slot is prepared, and thus the attachable and detachable device 100 can provide an extension function to an existing imaging apparatus 110. Instead of the form of an SD card, the attachable and detachable device 100 may be configured to be attached to the imaging apparatus 110 at any interface used to attach a storage device at least capable of storing an image captured by the imaging apparatus 110. For example, the attachable and detachable device 100 may include a Universal Serial Bus (USB) interface and may be configured to be attached to a USB socket of the imaging apparatus 110. The attachable and detachable device 100 may be configured to have a recording function for recording an image captured by the imaging apparatus 110, but may not necessarily need to have the recording function.

For example, the predetermined processing circuit of the attachable and detachable device 100 is implemented on a field-programmable gate array (FPGA) programmed to execute predetermined processing. The predetermined processing circuit, however, may be implemented in another form.

The imaging apparatus 110 is an imaging apparatus such as a network camera. In the present embodiment, the imaging apparatus 110 has a built-in arithmetic device capable of processing an image. The present invention, however, is not limited to this. For example, there may be an external computer such as a personal computer (PC) connected to the imaging apparatus 110, and the combination of the external computer and the imaging apparatus 110 may be treated as the imaging apparatus 110.

In the present embodiment, as an example, attachable and detachable devices 100 are attached to all imaging apparatuses 110. FIG. 1 illustrates four imaging apparatuses 110 and attachable and detachable devices 100 attached to the respective imaging apparatuses 110. The number of combinations of these apparatuses, however, may be three or less or may be five or more.

The attachable and detachable device 100 having an image analysis function is attached to the imaging apparatus 110, and thus the imaging apparatus 110 can execute image processing even if the imaging apparatus 110 does not have the image analysis function. In the form in which an arithmetic device for image processing is provided in the imaging apparatus 110 as in the present embodiment, the following effect is obtained. That is, the attachable and detachable device 100 in which an arithmetic device is provided is attached to the imaging apparatus 110, thereby making it possible to diversify or sophisticate image processing that can be executed by the imaging apparatus 110. An input/output apparatus 130 is an apparatus that receives an input from a user and outputs information (e.g., displays the information) to the user.

In the present embodiment, for example, the input/output apparatus 130 is a computer such as a PC. A browser and a native application installed on the computer are executed by a processor built into the computer, thereby inputting and outputting information. The imaging apparatus 110 and the input/output apparatus 130 are connected to each other via a network 120 so that the imaging apparatus 110 and the input/output apparatus 130 can communicate with each other. For example, the network 120 includes a plurality of routers, switches, and cables meeting a communication standard such as Ethernet (registered trademark). In the present embodiment, the network 120 may be any network that enables communication between the imaging apparatus 110 and the input/output apparatus 130, and can be constructed on any scale, in any configuration, and based on any communication standard with which the network 120 is compliant. The network 120 can be, for example, the Internet, a wired local area network (LAN), a wireless LAN, or a wide area network (WAN). For example, the network 120 can be configured to perform communication based on a communication protocol compliant with the Open Network Video Interface Forum (ONVIF) standard. The configuration, however, is not limited to this. For example, the network 120 may be configured to perform communication based on another communication protocol such as a unique communication protocol.

Configuration of Imaging Apparatus

Figure 2:
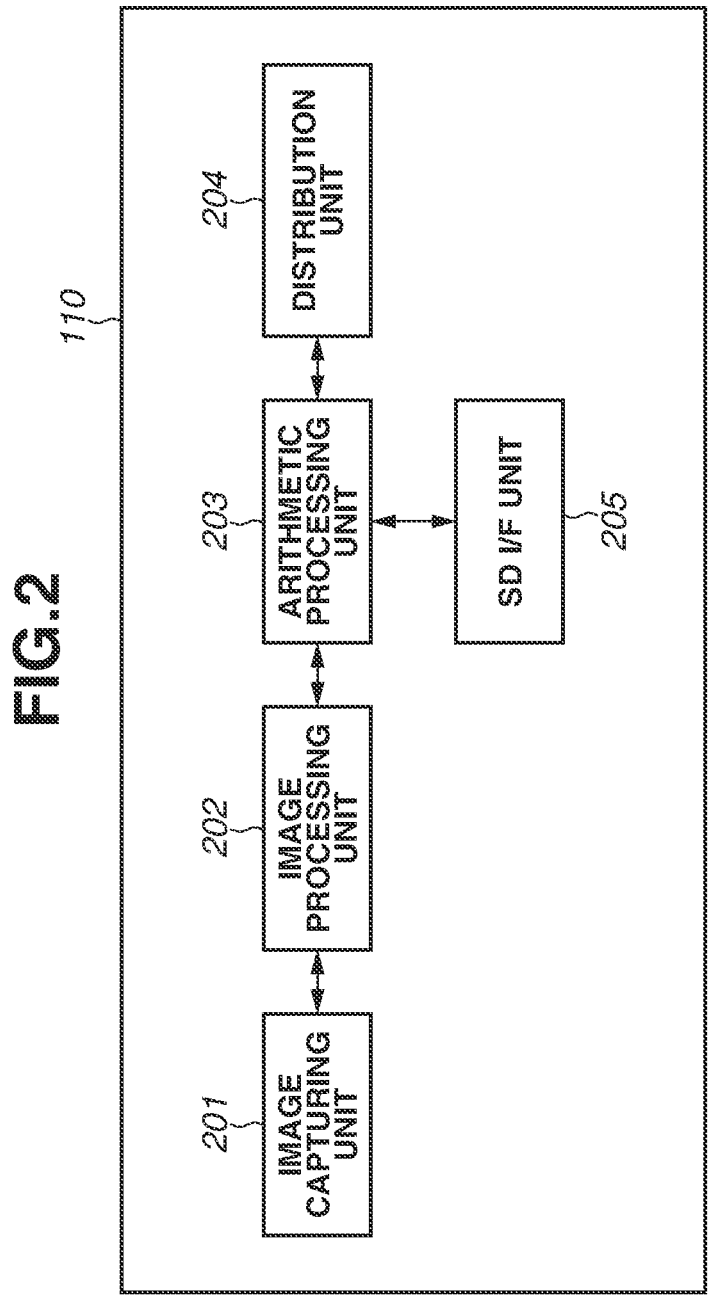
FIG. 2 is a diagram illustrating a hardware configuration of an imaging apparatus according to the embodiments.

Next, the configuration of the imaging apparatus 110 is described. FIG. 2 is a diagram illustrating an example of the hardware configuration of the imaging apparatus 110. For example, the imaging apparatus 110 includes as its hardware components an image capturing unit 201, an image processing unit 202, an arithmetic processing unit 203, a distribution unit 204, and an SD interface (I/F) unit 205. The image capturing unit 201 includes a lens unit that forms an image of light, and an image sensor that converts the light of which the image is formed into an analog signal according to the light. The lens unit has a zoom function for adjusting the angle of view, and an aperture function for adjusting the amount of light. The image sensor has a gain function for adjusting the sensitivity when converting the light into the analog signal. These functions are adjusted based on setting values of which the image capturing unit 201 is notified by the image processing unit 202.

The analog signal acquired by the image capturing unit 201 is converted into a digital signal by an analog-digital conversion circuit, and the digital signal is transferred as an image signal to the image processing unit 202. The arithmetic processing unit 203 includes one or more processors such as a central processing unit (CPU) and a microprocessor unit (MPU), memories such as a random-access memory (RAM) and a read-only memory (ROM), and drivers for I/Fs.

As an example, the arithmetic processing unit 203 can determine assignments, such as which of the imaging apparatus 110 and the attachable and detachable device 100 is to execute parts of processing to be executed by the above system, and can execute processing corresponding to the determined assignments.

The arithmetic processing unit 203 transfers the image received from the image processing unit 202 to the distribution unit 204 or the SD I/F unit 205. The arithmetic processing unit 203 also transfers data of an analysis result to the distribution unit 204. The distribution unit 204 includes a network distribution engine and peripheral devices such as a RAM and an Ethernet physical layer (ETH PHY) module. The ETH PHY module is a module that executes the processing of the physical (PHY) layer of Ethernet.

The distribution unit 204 converts the image data and the data of the analysis result acquired from the arithmetic processing unit 203 into a format that can be distributed to the network 120, and outputs the converted data to the network 120. The SD I/F unit 205 is an interface portion for connecting to the attachable and detachable device 100, and for example, includes a power supply and an attachment mechanism such as an attachment/detachment socket to and from which the attachable and detachable device 100 is attached and detached.

In this case, the SD I/F unit 205 is configured to conform to the SD standard formulated by the SD Association. Communication between the attachable and detachable device 100 and the imaging apparatus 110, such as the transfer of the image acquired from the arithmetic processing unit 203 to the attachable and detachable device 100 and the acquisition of data from the attachable and detachable device 100, is performed via the SD I/F unit 205.

Figure 3:
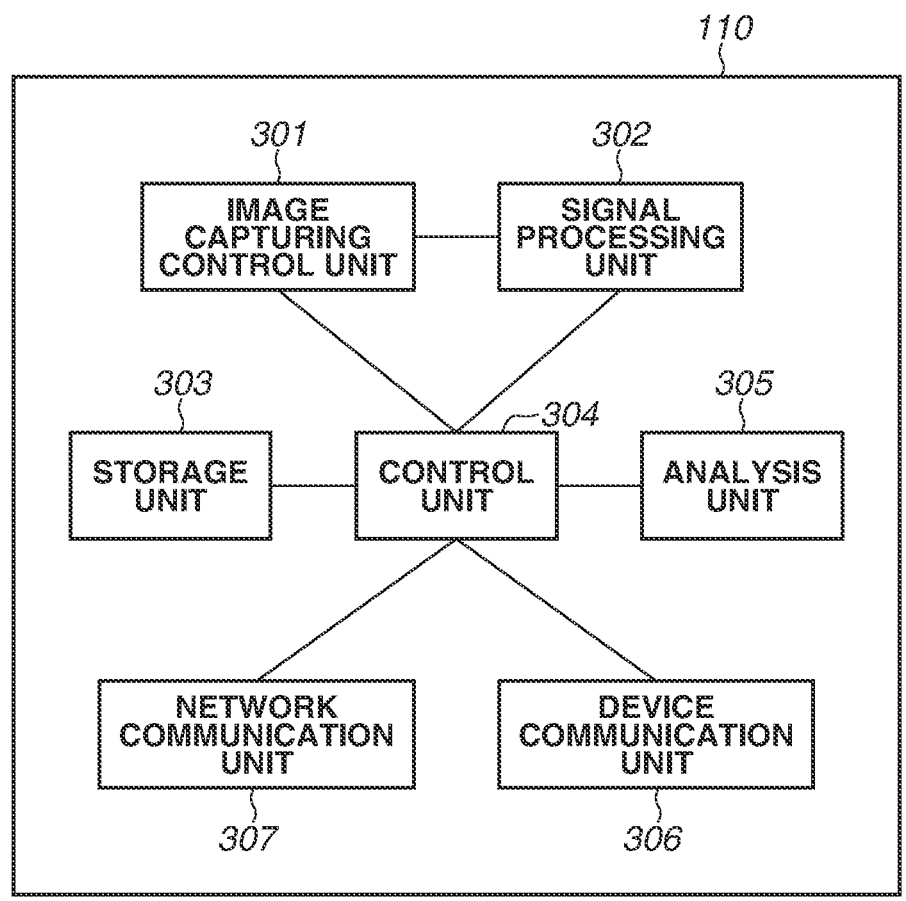
FIG. 3 is a diagram illustrating a functional configuration of the imaging apparatus according to the embodiments.

FIG. 3 illustrates an example of the functional configuration of the imaging apparatus 110. For example, the imaging apparatus 110 includes as its functions an image capturing control unit 301, a signal processing unit 302, a storage unit 303, a control unit 304, an analysis unit 305, a device communication unit 306, and a network communication unit 307. The image capturing control unit 301 executes control to capture the surrounding environment via the image capturing unit 201.

The signal processing unit 302 performs a predetermined process on an image captured by the image capturing control unit 301, thereby generating data of the captured image (image data). Hereinafter, the data of the captured image will be referred to simply as the "captured image" or the "image", where appropriate. As described above, the captured image may be a still image or may be a moving image.

For example, the signal processing unit 302 encodes the image captured by the image capturing control unit 301. For example, the signal processing unit 302 encodes a still image using a Joint Photographic Experts Group (JPEG) coding method. The signal processing unit 302 encodes a moving image using an H.264/Moving Picture Experts Group (MPEG)-4 Advanced Video Coding (AVC) (hereinafter referred to as "H.264") or High Efficiency Video Coding (HEVC) coding method.

The signal processing unit 302 may encode the image using a coding method selected by the user, for example, through an operation unit (not illustrated) of the imaging apparatus 110 from among a plurality of coding methods set in advance. The storage unit 303 stores a list of analysis processes that can be executed by the analysis unit 305 (hereinafter referred to as a "first process list") and a list of post-processes to be executed on the results of the analysis processes. The storage unit 303 stores the results of the analysis processes.

Although processes to be executed are analysis processes in the present embodiment, any process may be executed. Regarding processes related to the processes to be executed, the storage unit 303 can store the first process list and the list of post-processes. The control unit 304 controls the signal processing unit 302, the storage unit 303, the analysis unit 305, the device communication unit 306, and the network communication unit 307 to each execute a predetermined process.

The analysis unit 305 selectively executes at least any of a pre-analysis process, an analysis process, and a post-analysis process on the captured image. The pre-analysis process is a process to be executed on the captured image before the analysis process is executed. In the pre-analysis process according to the present embodiment, as an example, the process of creating divided images by dividing the captured image is executed.

The analysis process is the process of outputting information obtained by analyzing an input image. In the analysis process according to the present embodiment, as an example, the process of receiving the divided images obtained by the pre-analysis process as inputs, executing at least any of a human body detection process, a face detection process, and a vehicle detection process on the divided images, and outputting analysis results is executed.

The analysis process can be a process of outputting the position of an object in the divided images using a machine learning model trained to detect an object included in an image, for example, based on a technique discussed in the following literature: "J. Redmon, A. Farhadi, 'YOLO9000: Better Faster Stronger', Computer Vision and Pattern Recognition (CVPR) 2016"

The post-analysis process is a process executed after the analysis process is executed. In the post-analysis process according to the present embodiment, as an example, the process of, based on the analysis results of the divided images, outputting as an analysis result a value obtained by totaling the numbers of objects detected in the respective divided images is executed.

The analysis process may be the process of performing pattern matching, detecting an object in an image, and outputting the position of the object. The device communication unit 306 communicates with the attachable and detachable device 100. The device communication unit 306 converts input data into a format that can be processed by the attachable and detachable device 100, and transmits the data obtained by the conversion to the attachable and detachable device 100.

The device communication unit 306 also receives data from the attachable and detachable device 100 and converts the received data into a format that can be processed by the imaging apparatus 110. In the present embodiment, the device communication unit 306 executes as the conversion process the process of converting a decimal between a floating point format and a fixed point format. The configuration, however, is not limited to this. The device communication unit 306 may execute another process.

In the present embodiment, the device communication unit 306 transmits a command sequence determined in advance in the scope of the SD standard to the attachable and detachable device 100 and receives a response from the attachable and detachable device 100, thereby communicating with the attachable and detachable device 100. The network communication unit 307 communicates with the input/output apparatus 130 via the network 120.

Configuration of Attachable and Detachable Device

Figure 4:
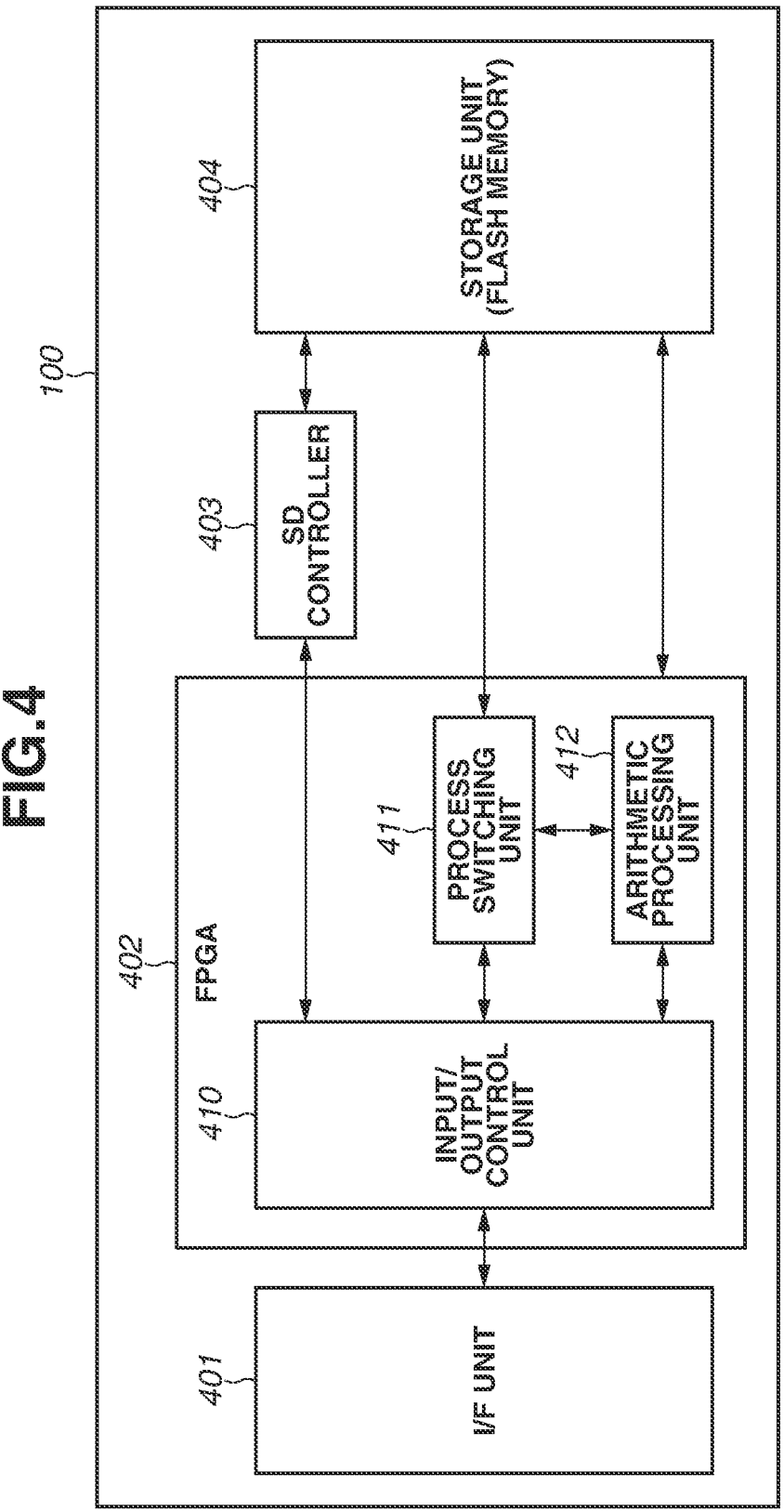
FIG. 4 is a diagram illustrating a hardware configuration of an attachable and detachable device according to the embodiments.

FIG. 4 illustrates an example of the hardware configuration of the attachable and detachable device 100. As an example, the attachable and detachable device 100 includes an I/F unit 401, an FPGA 402, an SD controller 403, and a storage unit 404.

The attachable and detachable device 100 is formed in a shape that enables the insertion and the removal of the attachable and detachable device 100 into and from the attachment/detachment socket of the SD I/F unit 205 included in the imaging apparatus 110, i.e., a shape compliant with the SD standard.

The I/F unit 401 is an interface portion for connecting the attachable and detachable device 100 to an apparatus such as the imaging apparatus 110. For example, the I/F unit 401 includes an electrical contact terminal that receives power supplied from the imaging apparatus 110, and generates and distributes power to be used in the attachable and detachable device 100.

Similarly to the SD I/F unit 205 of the imaging apparatus 110, the I/F unit 401 complies with the SD standard regarding an item defined by (compliant with) the SD standard. The reception of an image and setting data from the imaging apparatus 110 and the transmission of data from the FPGA 402 to the imaging apparatus 110 are executed via the I/F unit 401.

The FPGA 402 includes an input/output control unit 410, a process switching unit 411, and an arithmetic processing unit 412. The FPGA 402 is a type of a semiconductor device capable of repeatedly reconfiguring a logic circuit structure within the semiconductor device. By a process achieved by the FPGA 402, a processing function for an image analysis can be added (provided) to an apparatus to which the attachable and detachable device 100 is attached. Since the logic circuit structure can be changed later by the reconfiguration function of the FPGA 402, the attachable and detachable device 100 that is attached to, for example, an apparatus in a fast-advancing field enables the apparatus to execute an appropriate process in a timely manner.

In the present embodiment, an example is described where an FPGA is used. Alternatively, for example, a general-purpose application-specific integrated circuit (ASIC) or a dedicated large-scale integration (LSI) circuit may be used so long as the processes according to the embodiments can be achieved. The FPGA 402 is started by writing, from a dedicated I/F, setting data that includes information regarding a logic circuit structure to be generated, or reading the setting data from the dedicated I/F. In the present embodiment, the setting data is held (stored) in the storage unit 404.

The storage unit 404 is composed of, for example, a NAND flash memory. For example, the storage unit 404 stores data such as image data written from the imaging apparatus 110, and information regarding the image analysis function written to the arithmetic processing unit 412. The storage unit 404 also stores, for example, various pieces of information regarding setting data of the FPGA 402 and circuit data for an analysis. As the storage unit 404, a RAM may be also used.

If the FPGA 402 is powered on, the FPGA 402 reads setting data from the storage unit 404, generates a logic circuit, and starts. The configuration, however, is not limited to this. For example, a dedicated circuit may be implemented in the attachable and detachable device 100, and the imaging apparatus 110 may write the setting data to the FPGA 402 via the I/F unit 401.

The input/output control unit 410 includes a circuit for transmitting and receiving an image to and from the imaging apparatus 110, a circuit for analyzing a command received from the imaging apparatus 110, and a circuit for performing control based on the result of the analysis. These commands are defined by the SD standard, and the input/output control unit 410 can detect some of the commands.

The input/output control unit 410 performs control such that an image is transmitted to the SD controller 403 in a case where a storage process is performed, and an image is transmitted to the arithmetic processing unit 412 in a case where an image analysis is performed. If the input/output control unit 410 receives setting data for switching processes, the input/output control unit 410 transmits the setting data to the process switching unit 411.

The SD controller 403 is a known control integrated circuit (IC) defined by (compliant with) the SD standard. The SD controller 403 controls a slave operation based on the SD protocol and controls the reading and writing of data from and to the storage unit 404.

The process switching unit 411 includes a circuit for, based on setting data received from the imaging apparatus 110, acquiring information regarding the image analysis function from the storage unit 404 and writing the information to the arithmetic processing unit 412.

For example, the information regarding the image analysis function is setting parameters indicating the order and the types of calculations to be processed in the arithmetic processing unit 112 and coefficients for the calculations. The arithmetic processing unit 412 includes a plurality of arithmetic circuits for executing the image analysis function.

Based on the information regarding the image analysis function received from the process switching unit 411, the arithmetic processing unit 412 executes arithmetic processes, transmits the analysis results of the arithmetic processes to the imaging apparatus 110, and/or records the analysis results in the storage unit 404. As described above, the FPGA 402 extracts setting data for a processing function to be executed, which is included in pieces of setting data corresponding to a plurality of processing functions held in advance, and rewrites a processing content to be executed by the arithmetic processing unit 412 based on the extracted setting data.

Consequently, the attachable and detachable device 100 can selectively execute at least any of the plurality of processing functions. Setting data of a process to be newly added is added as needed, thereby causing the imaging apparatus 110 to execute the latest process.

Hereinafter, having a plurality of pieces of setting data corresponding to a plurality of processing functions is described as "having a plurality of processing functions". That is, even in the state where the FPGA 402 of the attachable and detachable device 100 is configured to execute a single processing function, if the processing content of the arithmetic processing unit 412 can be changed based on setting data for another processing function, this case is described as "having a plurality of processing functions".

Figure 5:
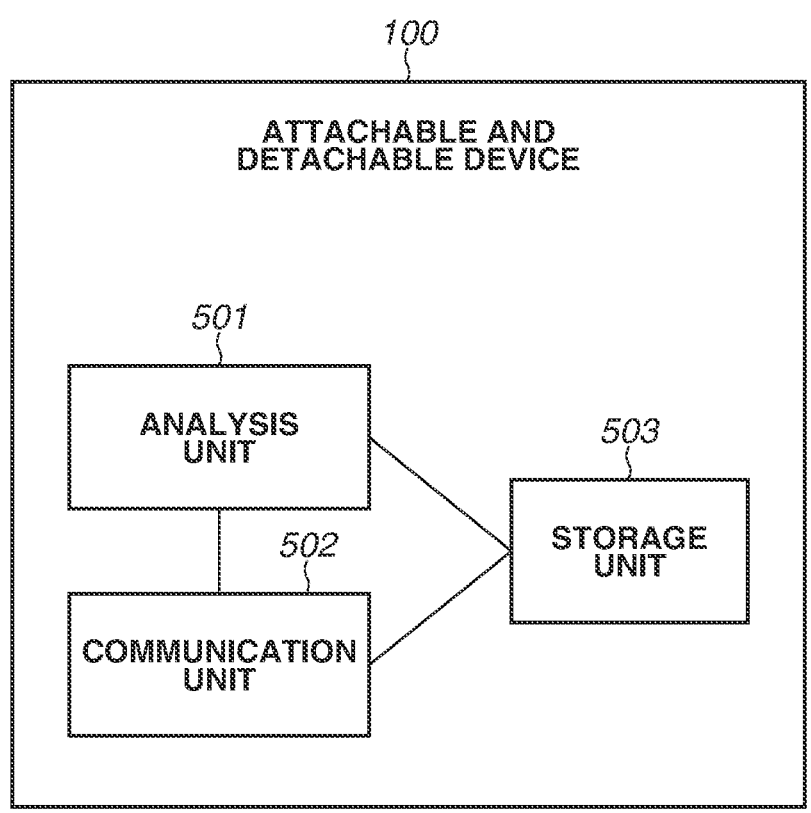
FIG. 5 is a diagram illustrating a functional configuration of the attachable and detachable device according to the embodiments.

Next, FIG. 5 illustrates an example of the functional configuration of the attachable and detachable device 100. For example, the attachable and detachable device 100 includes as its functional components an analysis unit 501, a communication unit 502, and a storage unit 503.

The analysis unit 501 executes an analysis process on an image input from the imaging apparatus 110. For example, in a case where a setting request to set an analysis process is input to the analysis unit 501, the analysis unit 501 sets itself to the state where the analysis unit 501 can execute the analysis process for which the setting request is input. Specifically, as described above, the analysis unit 501 reconfigures the logic circuit structure of the FPGA 402 to execute the specified analysis process. Then, if an image is input from the imaging apparatus 110, the analysis unit 501 executes the set analysis process on the input image.

In the present embodiment, analysis processes that can be executed by the analysis unit 501 are a human body detection process and a face detection process. The executable analysis process, however, is not limited to these. For example, the analysis processes may also include the process of determining whether a person stored in advance is included in an image. For example, the degree of coincidence between the image feature amount of a person stored in advance and the image feature amount of a person detected from an input image is calculated, and if the degree of coincidence is greater than or equal to a threshold, it is determined that the detected person is the person stored in advance. The analysis processes may also include the process of superimposing a predetermined mask image on a person detected from an input image or performing a mosaic process on the person for the purpose of protecting privacy. A plurality of analysis processes among these analysis processes may be executed.

The analysis processes may also include the process of detecting whether a person in an image performs a particular action using a trained model having learned a particular action of a person by machine learning. Furthermore, the analysis processes may also include the process of determining what area an area in an image is. For example, the analysis processes may be the process of, using a trained model having learned a building, a road, a person, and the sky by machine learning, determining what area an area in an image is.

As described above, the analysis processes that can be executed are applicable to both an image analysis using machine learning and an image analysis not using machine learning. Each of the above analysis processes may not be performed by the attachable and detachable device 100 alone, and may be executed by the attachable and detachable device 100 cooperatively with the imaging apparatus 110.

Next, the communication unit 502 communicates with the imaging apparatus 110 via the I/F unit 401. Specifically, an image is input from the imaging apparatus 110, and an analysis result is read from the imaging apparatus 110 via the I/F unit 401.

The storage unit 503 stores information regarding the setting content of an analysis process and a clock frequency for the analysis process. The clock frequency for the analysis process is information indicating the value of the clock frequency of the arithmetic processing unit 412 required to complete the analysis process on predetermined image units. Additionally, the storage unit 503 also stores the information described above in the description of the storage unit 404.

Method for Determining Waiting Time for Reading Analysis Result

Next, a description is given of a method for determining a reading time in which the imaging apparatus 110 reads the result of a process (a video analysis) performed by the attachable and detachable device 100. Specifically, a description is given of a method for determining a waiting time from when the imaging apparatus 110 inputs (transmits) an image as a target of an image analysis process to the attachable and detachable device 100 and instructs the attachable and detachable device 100 to execute the image analysis process to when the imaging apparatus 110 requests the attachable and detachable device 100 to acquire the result of the image analysis to read the result. In the case of the attachable and detachable device 100 using the SD card communication protocol, there is no method for the attachable and detachable device 100 serving as a slave to the imaging apparatus 110 as a master to actively notify the host imaging apparatus 110 of time information or completion of the analysis process. The attachable and detachable device 100 is a device using the SD card communication protocol and, without receiving from the imaging apparatus 110 a request to acquire the result of an image analysis, cannot transmit the result from the attachable and detachable device 100 to the imaging apparatus 110. The imaging apparatus 110 communicates with the attachable and detachable device 100 based on the SD card communication protocol. According to the SD card communication protocol, unless the imaging apparatus 110 transmits to the attachable and detachable device 100 a request to acquire the result of an image analysis, the imaging apparatus 110 cannot acquire the analysis result from the attachable and detachable device 100. Thus, conventionally, to acquire the analysis result of a captured image from the attachable and detachable device 100, the imaging apparatus 110 needs to make a request to acquire the analysis result. According to the conventional technique, it is impossible for the imaging apparatus 110 to know when the analysis process ends in the attachable and detachable device 100. Thus, the imaging apparatus 110 cannot know when it is suitable to make the request to the attachable and detachable device 100. As a solution to the issue, in the present embodiment, a description is given of a method for determining a reading time in which the imaging apparatus 110 reads the result of a process (a video analysis) performed by the attachable and detachable device 100. Furthermore, the following issue arises. When the attachable and detachable device 100 uses a clock supplied from the imaging apparatus 110 for the analysis process, the time required for the analysis process varies depending on the clock cycle. The method for determining the reading time according to the present embodiment can solve this issue. The "clock cycle" refers to the length of time taken for a single repetition cycle of a clock signal.

Figure 6:
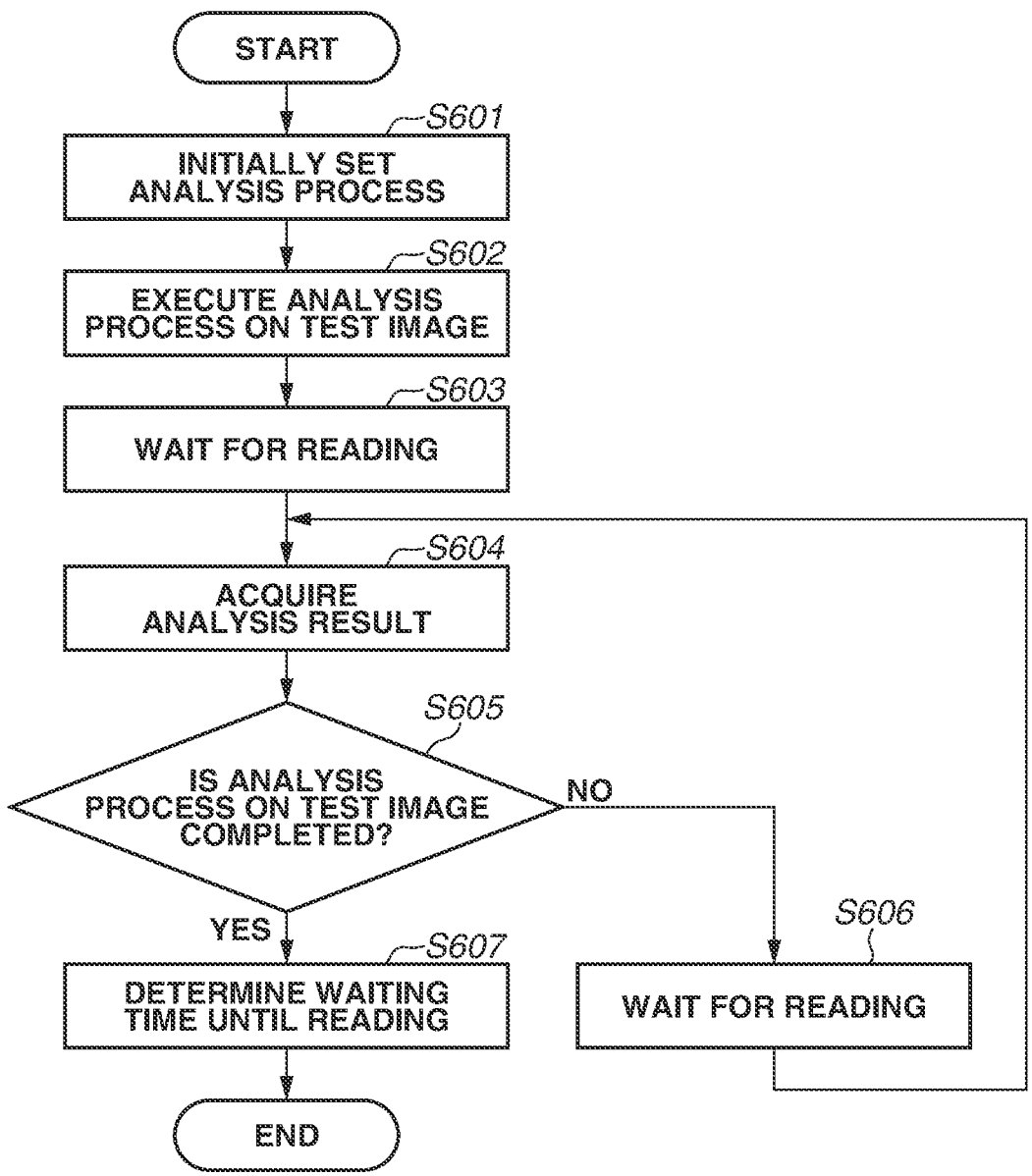
FIG. 6 is a diagram illustrating a method for measuring a time required for an analysis process according to a first embodiment.

With reference to FIG. 6, a description is given of a method for determining a waiting time for reading an analysis result (an information processing method). Processing in the flowchart illustrated in FIG. 6 is executed if the control unit 304 determines that the attachable and detachable device 100 attached to the imaging apparatus 110 is a device capable of executing an image analysis.

First, the control unit 304 of the imaging apparatus 110 issues a command to start an analysis process to the attachable and detachable device 100 via the device communication unit 306. Then, in step S601, the control unit 304 makes settings for the analysis process.

The analysis unit 501 of the attachable and detachable device 100, upon receipt of the command, sets circuit data for the analysis process stored in the storage unit 503. That is, as described above, the analysis unit 501 reconfigures the logic circuit structure of the FPGA 402 to execute the specified analysis process.

Next, in step S602, the control unit 304 of the imaging apparatus 110 transmits a predetermined image (hereinafter referred to as a "test image") for the analysis process set in step S601 to the attachable and detachable device 100 via the device communication unit 306, and instructs the attachable and detachable device 100 to execute an image analysis to cause the attachable and detachable device 100 to execute (start) the image analysis. The storage unit 303 of the imaging apparatus 110 holds the analysis result of analyzing the test image. That is, the storage unit 303 holds information indicating a value as a correct answer for (an expected value of) an analysis result. Data of the test image and the expected value of the data may be stored in the storage unit 503 of the attachable and detachable device 100.

As an image to be used as the test image, data in which a data line on the SD I/F frequently switches between a high level and a low level (0x0F0F or 0xA5A5) may be used. Consequently, it is possible to acquire the time until the analysis process is completed, and also check the waveform quality of an electric signal used in communication, such as the influence of crosstalk on the SD I/F.

In step S603, the control unit 304 of the imaging apparatus 110 waits a predetermined time to read the analysis result. That is, the control unit 304 of the imaging apparatus 110 waits until the predetermined time elapses.

The waiting time at this time may be a fixed value determined in advance, but may be determined based on the information regarding the clock frequency read from the attachable and detachable device 100. A description is given of a method for determining the initial value of the waiting time (a first time).

To determine the clock cycle in which the attachable and detachable device 100 operates, the control unit 304 of the imaging apparatus 110 communicates with the attachable and detachable device 100 via the device communication unit 306. For example, the control unit 304 of the imaging apparatus 110 acquires the information indicating the value of the clock frequency required to complete the analysis process on predetermined image units that is stored in the storage unit 503 of the attachable and detachable device 100. The clock cycle is multiplied by the clock frequency, whereby it is possible to determine the initial value of the time required to complete the analysis process on the predetermined image units.

The time required for the analysis process depends on the access speed (the communication speed) between the imaging apparatus 110 and the attachable and detachable device 100. For example, even in the same image analysis, the time required for the analysis process may vary depending on the type of the SD protocol with which the imaging apparatus 110 is compatible.

For example, if the access speed between the imaging apparatus 110 and the attachable and detachable device 100 is High Speed Mode of the SD protocol, the frequency of the clock is a maximum of 50 MHz. If, however, the access speed is UHS-I Mode, the frequency of the clock is a maximum of 208 MHz. Even in the same access mode, the imaging apparatus (a host device) can select any clock frequency (the multiplicative inverse of the clock cycle) in the range where the clock frequency does not exceed the maximum frequency. Thus, even in the same attachable and detachable device 100, the time required for the analysis process in the attachable and detachable device 100 varies depending on the imaging apparatus into which the attachable and detachable device 100 is inserted.

Thus, the initial value of the waiting time for reading the analysis result of the first test image may be determined by being calculated based on the clock cycle determined based on a communication mode (an access mode) between the imaging apparatus 110 and the attachable and detachable device 100, and the clock frequency required for the analysis process. For example, if the access mode is High Speed Mode (the maximum clock: 50 MHz) and the clock frequency required for the analysis process is 100,000, the waiting time can be set to a clock cycle of 20 ns×a clock frequency of 100,000=2 ms as the initial value. The initial value may be a time shorter by a predetermined time than the thus calculated time. This can derive a more appropriate waiting time by gradually lengthening a waiting time described below.

In step S604, the control unit 304 of the imaging apparatus 110 executes an acquisition process for issuing (transmitting) an acquisition command to acquire the analysis result (a request or an instruction to acquire the analysis result) to the attachable and detachable device 100 via the device communication unit 306 and acquiring information indicating the analysis result from the attachable and detachable device 100 (a first acquisition process). For example, this acquisition command is a read command defined by (compliant with) the SD standard. For example, the acquisition command is a READ_SINGLE_BLOCK command or a READ_MULTIPLE_BLOCK command.

In this manner, the control unit 304 also functions as an acquisition unit.

Then, in step S605, the control unit 304 compares the analysis result acquired by the first acquisition process and the expected value (the correct answer) held in advance and determines whether the analysis process on the test image is completed. In this manner, the control unit 304 also functions as a determination unit.

The process of step S605 is described in more detail.

First, the analysis result and the expected value are described. In a case where the analysis process is counting the number of people, the analysis result and the expected value are each information indicating the number of people. In a case where the analysis process is the human body detection process, the face detection process, or the vehicle detection process, the analysis result and the expected value are information indicating the presence or absence of a detection target or the position of the detected target in an image.

With reference to FIGS. 7A, 7B, and 7C, a description is given of a test image in a case where the type of the image analysis is the counting of the number of people. FIG. 7A illustrates an image having a similar size (image size) to or the same size as the image size of an image captured by the imaging apparatus 110. This test image illustrates a still image including eight human bodies in total.

In a case where the number of people is counted in the image illustrated in FIG. 7A, typically, the test image is divided into predetermined image units termed "patches" as the processing units of the analysis process as illustrated in FIG. 7B. In this case, the test image is divided into nine patches P1 to P9.

The analysis unit 501 of the attachable and detachable device 100 executes image analyses of the divided patches P1 to P9. In a case where the number of people is derived from the entire image, the analysis results of the respective patches are obtained as in FIG. 7C, and the result of eight people, which is the number of people in the entire image, is derived from the total of the analysis results. As the test image, not all the patches P1 to P9 need to be used, and at least one patch of which the analysis result is grasped may only need to be used.

For example, in a case where the patch P6 is used as the test image and where the analysis result of two people, which is the expected value, is acquired as the acquisition result of the first acquisition process from the attachable and detachable device 100, the control unit 304 of the imaging apparatus 110 can determine that the analysis process is completed. Even if the analysis process is not completed, no data is returned, or information indicating the result of the previous analysis process is returned from the attachable and detachable device 100. In this case, the control unit 304 of the imaging apparatus 110 acquires, as the acquisition result of the first acquisition process, the result indicating that no data is acquired or the result indicating that information indicating the result of the previous analysis process is acquired.

Thus, if another analysis result indicating a value other than "two people" is acquired as the acquisition result of the first acquisition process from the attachable and detachable device 100, the control unit 304 can determine that the analysis process is not completed. In a case where the type of the image analysis is object detection, the control unit 304 changes the test image according to the type of the image analysis to use a still image including an object as a target to be detected. Then, based on the presence or absence of detection of the object or the position of the object in the image, the control unit 304 can determine whether the image analysis process on the predetermined image (the test image) is completed. For example, in step S605, if the position of the detected object matches the expected value or is within a predetermined range, the control unit 304 determines that the analysis process on the predetermined image is completed.

If the control unit 304 determines in step S605 that the analysis process on the test image is completed (Yes in step S605), the processing proceeds to step S607. If, on the other hand, it is determined that the analysis process on the test image is not completed (No in step S605), the processing proceeds to step S606.

In step S606, the control unit 304 additionally waits a predetermined time (a second time). For example, the predetermined time is a time equivalent to 5% of the initial value. Then, the processing returns to step S604, and the above acquisition process is executed again (a second acquisition process). As described above, if, based on the acquisition result of the first acquisition process, the control unit 304 (the acquisition unit) determines that the image analysis is not completed, and the second time further elapses, the control unit 304 executes the second acquisition process for requesting the attachable and detachable device 100 to acquire the result of the analysis process on the predetermined image and acquiring the result of the image analysis of the predetermined image from the attachable and detachable device 100 again.

On the other hand, in step S607, according to the comparison result in step S605, the control unit 304 determines a waiting time for an image analysis in the future from when the control unit 304 instructs the attachable and detachable device 100 to execute the image analysis to when the control unit 304 reads the result of the image analysis. That is, the control unit 304 determines a waiting time to be used in an analysis process to be actually performed in the future on an image captured by the imaging apparatus 110. In other words, the control unit 304 (a determining unit) determines the waiting time based on the time from when the control unit 304 causes the attachable and detachable device 100 to start the image analysis of the predetermined image to when the determination unit determines that the image analysis of the predetermined image is completed.

If it is determined in the first round of step S605 that the analysis of the test image is completed, then based on this determination result, in step S607, the control unit 304 determines the initial value of the waiting time as the waiting time for the analysis process in the future. Alternatively, the control unit 304 may determine, as the waiting time in the future, a time obtained by offsetting the initial value by a predetermined time or a time obtained by multiplying the initial value by a predetermined coefficient.

If the determination is "No" in step S605, and steps S604 and S606 are executed several times, the following process is performed. In step S607, the control unit 304 determines, as the waiting time in the future, a time obtained by adding the additional waiting time in step S606 to the initial value of the waiting time as many times as a value obtained by subtracting 1 from the number of times steps S604 and S606 are executed. In other words, the control unit 304 measures the time required for the analysis process on the test image in predetermined time units, thereby determining the waiting time. In other words, the control unit 304 determines the waiting time based on the time required until the analysis process on the test image is completed. As described above, if, based on the acquisition result of the second acquisition process, the determination unit determines that the image analysis of the predetermined image is completed, the control unit 304 (the determining unit) determines the waiting time based on the first and second times.

If the determination is "No" in step S605 twice, steps S604 and S606 are executed three times in total. Thus, the control unit 304 determines, as the waiting time in the future, a time obtained by adding a time obtained by doubling the additional waiting time in step S606 to the initial value.

Alternatively, the control unit 304 may determine, as the waiting time in the future, a time obtained by offsetting the thus calculated time by a predetermined time or a time obtained by multiplying the thus calculated time by a predetermined coefficient. As described above, the control unit 304 also functions as a determining unit.

In the above description, an image in which a target to be actually detected appears is used as the test image. The configuration, however, is not limited to this. If an image has an image size (an amount of data) appropriate for an image analysis and enables the determination of whether the analysis process on the image is completed based on the analysis result, the image can be used as the test image.

If the waiting time determined in step S607 is greater than or equal to a certain value, the following process may be performed. For example, a frame interval (the time between frames) determined based on the frame rate required to perform the analysis process may be taken into account. If the determined waiting time is longer than the frame interval, the analysis process cannot be performed in real time. Thus, the control unit 304 may output, to the input/output apparatus 130 via the network communication unit 307, information (a message) for suggesting using an image analysis of the same type that requires a shorter time for the analysis to the user. Based on this information, the input/output apparatus 130 displays a graphical user interface (GUI) for allowing the user to select another analysis process on a display (not illustrated). This enables the user to use an analysis process appropriate for the frame rate of a selected application. As described above, the control unit 304 also functions as an output unit for, in a case where the determined waiting time is longer than a predetermined time, outputting information for allowing a user to select another image analysis.

As described above, according to the present embodiment, a waiting time is determined based on the result of an analysis process on a test image. Then, after the waiting time is determined, the control unit 304 transmits a captured image to the attachable and detachable device 100 and instructs the attachable and detachable device 100 to execute an image analysis process on the captured image, thereby causing the attachable and detachable device 100 to start the image analysis process. Then, if the determined waiting time elapses since the image analysis of the captured image is started, the control unit 304 executes an acquisition process for requesting the attachable and detachable device 100 to acquire the result of the image analysis of the captured image and acquiring the result of the image analysis of the captured image from the attachable and detachable device 100. Thus, an imaging apparatus can acquire at an appropriate timing the result of an image analysis that the imaging apparatus causes an attachable and detachable device to execute.

Figure 8:
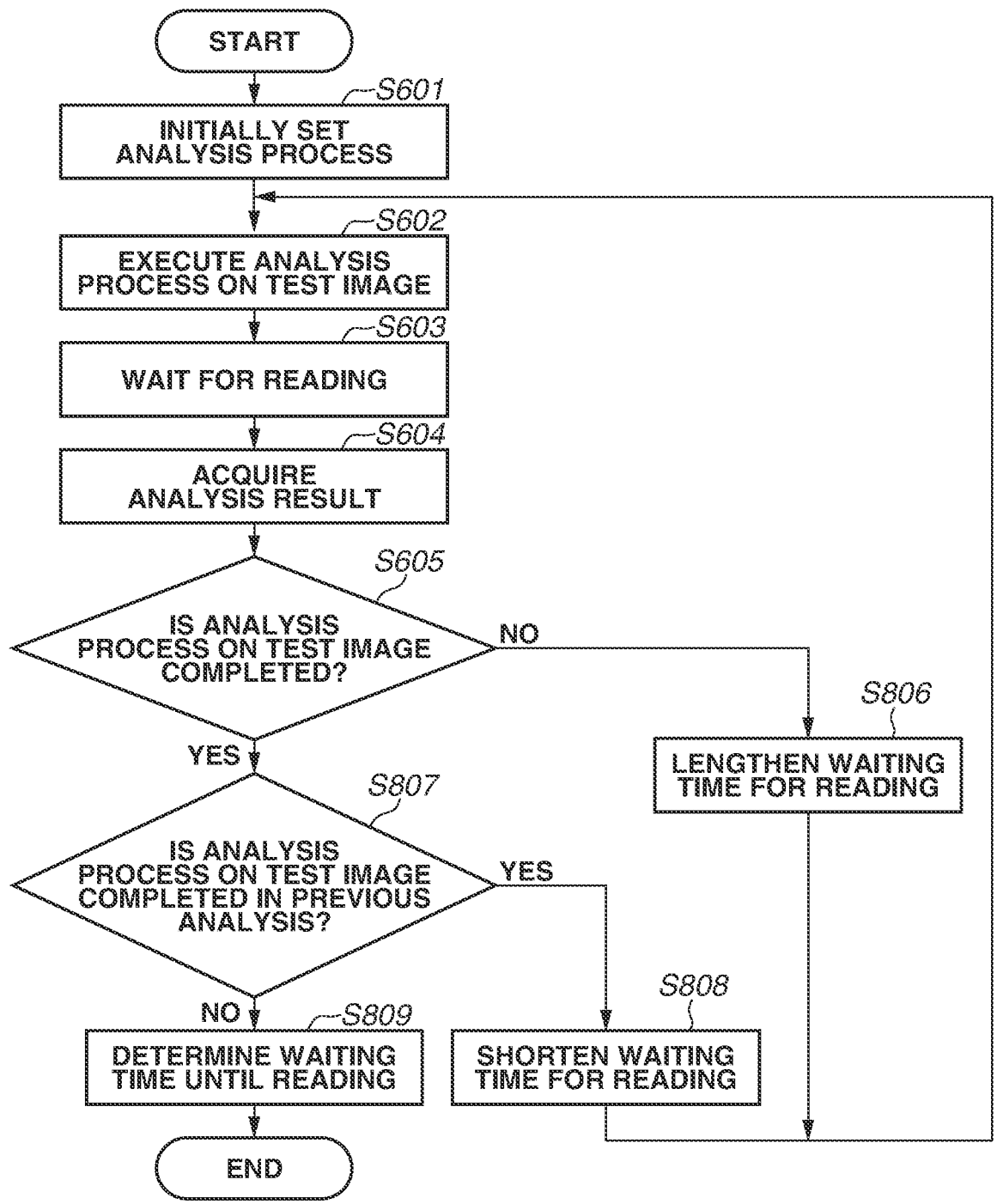
FIG. 8 is a diagram illustrating a method for measuring a time required for an analysis process a plurality of times according to a second embodiment.

With reference to FIG. 8, a description is given of a method for determining a waiting time for reading an analysis result (an information processing method) according to a second embodiment. The description of portions similar to those in the first embodiment is appropriately omitted. In the second embodiment, an analysis process on a test image is executed several times by changing a waiting time, thereby determining the waiting time more appropriately. Processing in the flowchart illustrated in FIG. 8 is executed if the control unit 304 determines that the attachable and detachable device 100 attached to the imaging apparatus 110 is a device capable of executing an image analysis.

Steps S601 to S605 are basically similar to those in the processing in FIG. 6.

If the control unit 304 determines in step S605 that the analysis process on the test image is completed (Yes in step S605), the processing proceeds to step S807. If, on the other hand, it is determined that the analysis process on the test image is not completed (No in step S605), the processing proceeds to step S806.

In step S806, the control unit 304 lengthens the waiting time in the next round of step S603 by a predetermined time. For example, the predetermined time is a time equivalent to 5% of the initial value. Then, the processing returns to step S602. That is, the waiting time in the next round of step S603 is the waiting time lengthened in step S806 (a third time). If the lengthened waiting time elapses, the above acquisition process is executed (a third acquisition process). As described above, the analysis process on the test image is repeated again until it is determined in step S605 that the analysis process on the test image is completed.

On the other hand, even if the control unit 304 determines in step S605 that the analysis process on the test image is completed, the waiting time may be too long.

In response, in step S807, it is determined whether the analysis process on the test image is completed in the previous analysis. The determination of the control unit 304 is "Yes" in the first round of step S807.

If it is determined in step S807 that the analysis process on the test image is completed in the previous analysis (Yes in step S807), the processing proceeds to step S808.

Then, in step S808, the control unit 304 shortens the waiting time in the next round of step S603 by a predetermined time. For example, the predetermined time is a time equivalent to 5% of the initial value.

If it is determined in step S807 that the analysis process on the test image is not completed in the previous analysis (No in step S807), the processing proceeds to step S809. That is, the determination is "No" in step S807, and the processing proceeds to step S809 in a case where, after the determination is "No" in the previous round of step S605, the waiting time is lengthened in step S806, and the determination is "Yes" in the next round of step S605.

Then, in step S809, the control unit 304 determines a waiting time to be used in an analysis process to be actually performed in the future on an image captured by the imaging apparatus 110.

Specifically, the control unit 304 determines the waiting time taken to wait the last time in step S603 as the waiting time for the analysis process in the future. The waiting time in step S603 may not need to be adopted as it is. That is, the control unit 304 may determine, as the waiting time in the future, a time obtained by offsetting the waiting time in step S603 by a predetermined time or a time obtained by multiplying the waiting time in step S603 by a predetermined coefficient.

As described above, if the third time longer than the first time elapses since the control unit 304 starts the image analysis again, the acquisition unit executes the third acquisition process for requesting the attachable and detachable device 100 to acquire the result of the image analysis of the predetermined image and acquiring the result of the image analysis of the predetermined image from the attachable and detachable device 100. Then, if, based on the acquisition result of the third acquisition process, the determination unit determines that the image analysis is completed, the determining unit determines the waiting time based on the third time.

As described above, according to the present embodiment, an analysis process on a test image is executed several times by changing a waiting time, whereby it is possible to determine the waiting time more appropriately.

Thus, an imaging apparatus can acquire at an appropriate timing the result of an image analysis that the imaging apparatus causes an attachable and detachable device to execute.

Other Embodiments

Figure 9:
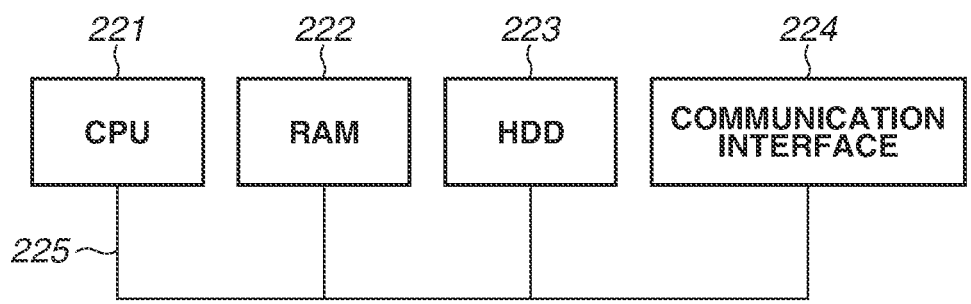
FIG. 9 is a block diagram illustrating another example of the hardware configuration of the imaging apparatus according to the embodiments.

With reference to FIG. 9, a description is given of another example of the hardware configuration for achieving the functions of the imaging apparatus according to the embodiments described above.

A RAM 222 temporarily stores a computer program to be executed by a CPU 221. The RAM 222 also temporarily stores data (a command and image data acquired from an external device via a communication interface 224. The RAM 222 also provides a work area to be used by the CPU 221 to execute various processes. For example, the RAM 222 also functions as a frame memory or functions as a buffer memory.

The CPU 221 executes the computer program stored in the RAM 222. Instead of the CPU, a processor such as a digital signal processor (DSP) or an ASIC may be used.

A hard disk drive (HDD) 223 stores a program for an operating system and image data. The HDD 223 also stores a computer program.

The computer program and the data stored in the HDD 223 are appropriately loaded into the RAM 222 and executed by the CPU 221 according to control of the CPU 221. Instead of the HDD, another storage medium such as a flash memory may be used. A bus 225 connects these hardware components. The hardware components exchange data with each other via the bus 225. This is another example of the hardware configuration according to the embodiments.

The present invention can also be achieved by a process in which one or more processors read and execute a program for achieving one or more functions of the above embodiments. The program may be supplied to a system or an apparatus including the one or more processors via a network or a storage medium. The present invention can also be achieved by a circuit (e.g., an ASIC) for achieving the one or more functions of the above embodiments.

The imaging apparatus according to the embodiments may be achieved by the hardware illustrated in FIG. 9 or can also be achieved by software.

The present invention is not limited to the above embodiments, and can be changed in various ways without departing from the spirit and scope of the present invention. For example, the combinations of the above embodiments and variations are also included in the disclosed content of the specification.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2020-177464, filed Oct. 22, 2020, which is hereby incorporated by reference herein in its entirety.

What is claimed is:

1. An imaging apparatus to which an attachable and detachable device attachable to and detachable from the imaging apparatus can be attached, the imaging apparatus comprising:
a processor; and
a memory storing one or more programs configured to be executed by the processor, the one or more programs including instructions for:
causing the attachable and detachable device attached to the imaging apparatus to start an image analysis of a predetermined image;
determining whether the image analysis of the predetermined image is completed; and
determining, based on a result of the determination as to whether the image analysis of the predetermined image is completed, a waiting time from when the imaging apparatus causes the attachable and detachable device to start an image analysis of a captured image captured by the imaging apparatus to when the imaging apparatus requests the attachable and detachable device to acquire a result of the image analysis.

2. The imaging apparatus according to claim 1, wherein the one or more programs further include instructions for acquiring the result of the image analysis of the captured image from the attachable and detachable device,
wherein causing the attachable and detachable device to start the image analysis of the captured image is performed after the determining the waiting time, and
wherein in a case where the determined waiting time elapses since the image analysis of the captured image is started, an acquisition process is executed for requesting the attachable and detachable device to acquire the result of the image analysis of the captured image and acquiring the result of the image analysis of the captured image from the attachable and detachable device.

3. The imaging apparatus according to claim 1, wherein the one or more programs further include instructions for storing a result of the image analysis of the predetermined image,
wherein, by comparing the result of the image analysis stored in the storing and a result of the image analysis of the predetermined image executed by the attachable and detachable device, the determination is made as to whether the image analysis of the predetermined image is completed.

4. The imaging apparatus according to claim 2,
wherein an acquisition process is executed for requesting the attachable and detachable device to acquire a result of the image analysis of the predetermined image and acquiring the result of the image analysis from the attachable and detachable device, and
wherein, based on a result of the acquisition process, the determination is made as to whether the image analysis of the predetermined image is completed.

5. The imaging apparatus according to claim 4,
wherein, in a case where a first time elapses since the image analysis of the predetermined image is started, a first acquisition process is executed for requesting the attachable and detachable device to acquire the result of the image analysis of the predetermined image and acquiring the result of the image analysis of the predetermined image from the attachable and detachable device,
wherein, in a case where, based on an acquisition result of the first acquisition process, a determination that the image analysis is not completed is made, after a second time further elapses, a second acquisition process is executed for requesting the attachable and detachable device to acquire the result of the image analysis of the predetermined image and acquiring the result of the image analysis of the predetermined image from the attachable and detachable device again, and
wherein, in a case where, based on an acquisition result of the second acquisition process, a determination that the image analysis of the predetermined image is completed is made, the waiting time is determined based on the first and second times.

6. The imaging apparatus according to claim 4,
wherein in a case where a first time elapses since the image analysis of the predetermined image is started, a first acquisition process is executed for requesting the attachable and detachable device to acquire the result of the image analysis of the predetermined image and acquiring the result of the image analysis of the predetermined image from the attachable and detachable device,
wherein, in a case where, based on an acquisition result of the first acquisition process, a determination that the image analysis is not completed is made, the imaging apparatus causes the attachable and detachable device to start the image analysis of the predetermined image again,
wherein, in a case where a third time longer than the first time elapses since the image analysis is started again, a third acquisition process is executed for requesting the attachable and detachable device to acquire the result of the image analysis of the predetermined image and acquiring the result of the image analysis of the predetermined image from the attachable and detachable device, and
wherein, in a case where, based on an acquisition result of the third acquisition process, a determination that the image analysis is completed is made, the waiting time is determined based on the third time.

7. The imaging apparatus according to claim 1, wherein the waiting time is determined based on a time based on an access mode used in communication between the imaging apparatus and the attachable and detachable device.

8. The imaging apparatus according to claim 1, wherein the one or more programs further include instructions for outputting, in a case where the determined waiting time is longer than a predetermined time, information for allowing a user to select another image analysis.

9. The imaging apparatus according to claim 1, wherein the waiting time is determined based on a time from when causing the attachable and detachable device to start the image analysis of the predetermined image to when determining that the image analysis of the predetermined image is completed.

10. The imaging apparatus according to claim 1, wherein the predetermined image has the same image size as a size of the captured image captured by the imaging apparatus.

11. The imaging apparatus according to claim 1, wherein the attachable and detachable device is a device incapable of, without receiving from the imaging apparatus a request to acquire a result of an image analysis, transmitting the result to the imaging apparatus.

12. The imaging apparatus according to claim 1,
wherein the attachable and detachable device is a device using a Secure Digital (SD) card communication protocol, and
wherein the imaging apparatus communicates with the attachable and detachable device based on the communication protocol.

13. An information processing method for an imaging apparatus to which an attachable and detachable device attachable to and detachable from the imaging apparatus can be attached, the information processing method comprising:
causing the attachable and detachable device attached to the imaging apparatus to start an image analysis of a predetermined image;
determining whether the image analysis of the predetermined image is completed; and
based on a result of the determination regarding whether the image analysis of the predetermined image is completed, determining a waiting time from when the imaging apparatus causes the attachable and detachable device to start an image analysis of a captured image captured by the imaging apparatus to when the imaging apparatus requests the attachable and detachable device to acquire a result of the image analysis.

14. A non-transitory computer-readable storage medium having stored thereon a computer program comprising instructions which, when the program is executed by a computer, cause the computer to carry out the method of claim 13.

* * * * *